United States Patent Office 3,623,883
Patented Nov. 30, 1971

3,623,883
SILVER HALIDE EMULSION CONTAINING BENZIMIDAZOLE CYANINE DYES
Konrad Jerzy Bannert and Douglas James Fry, Ilford, England, assignors to Ilford Limited, Ilford, Essex, England
No Drawing. Continuation-in-part of abandoned application Ser. No. 551,217, May 19, 1966. This application Feb. 3, 1970, Ser. No. 8,443
Claims priority, application Great Britain, Mar. 16, 1966, 11,553/66
Int. Cl. G03c 1/10
U.S. Cl. 96—137          1 Claim

ABSTRACT OF THE DISCLOSURE

Cyanine dyes of the general formula:

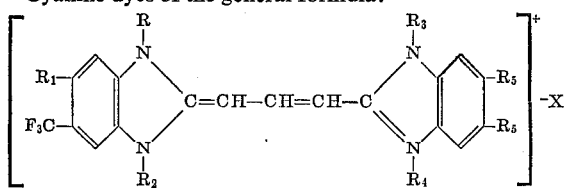

wherein $R_1$ represents a halogen atom or a lower alkyl or amine group, R and $R_3$ are the same or different and represent lower alkyl groups, $R_2$ and $R_4$ are the same or different and represent alkyl, hydroxyalkyl, aralkyl, carboxy-substituted aralkyl, carboxy-substituted alkyl, a group $-(CH_2)_nSO_3H$ wherein $n$ is an integer from 1 to 6, an acylsulphonamido alkyl group of the formula $-(CH_2)_nSO_2NHCOR_8$ where $n$ is an integer from 1 to 6 and $R_8$ is an alkyl group, or an alkyl or aralkyl sulphonamido alkyl group of the formula $-(CH_2)_nSO_2NHR_9$ where $n$ is an integer from 1 to 6 and $R_9$ is an alkyl or aralkyl group, $R_5$ represents a hydrogen or a halogen atom or an alkyl or amino group, $R_6$ represents a hydrogen or halogen atom or a trifluoromethyl, cyano or alkoxycarbonyl group, except that when $R_1$ and $R_5$ each represent a chlorine atom and $R_6$ represents a trifluoromethyl group $R_2$ and $R_4$ do not represent the same alkyl group. A process for production of the dyes and a photographic gelatino silver halide emulsion containing them are also disclosed.

---

This application is a continuation-in-part of U.S. application Ser. No. 551,217, filed May 19, 1966, now abandoned, and relates to cyanine dyes and to their production and use as optical sensitizing agents for photographic silver halide emulsions.

According to a first feature of the present invention there is provided a cyanine dye of the following general Formula I:

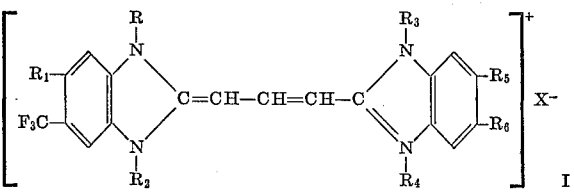

wherein $R_1$ represents a halogen atom or a lower alkyl or amine group, R and $R_3$ are the same or different and represent lower alkyl groups, $R_2$ and $R_4$ are the same or different and represent alkyl, hydroxyalkyl, aralkyl, carboxy-substituted aralkyl, carboxy-substituted alkyl, a group $-(CH_2)_nSO_3H$ where $n$ is an integer from 1 to 6, an acylsulphonamido alkyl group of the formula $-(CH_2)_nSO_2NHCOR_8$ where $n$ is an integer from 1 to 6 and $R_8$ is an alkyl group, or an alkyl or aralkyl sulphonamido alkyl group of the formula $-(CH_2)_nSO_2NHR_9$ where $n$ is an integer from 1 to 6 and $R_9$ is an alkyl or aralkyl group, $R_5$ represents hydrogen or a halogen atom or an alkyl or amino group, $R_6$ represents a hydrogen or halogen atom or a trifluoromethyl, cyano or alkoxycarbonyl group, except that when $R_1$ and $R_5$ each represent a chlorine atom and $R_6$ represents a trifluoromethyl group $R_2$ and $R_4$ do not represent the same alkyl group.

When $R_2$ and $R_4$ each represent a sulpho-alkyl group, i.e. $-(CH_2)_nSO_3H$ the dye is usually isolated in the form of the anhydro hydroxide compound.

According to a second feature of the present invention symmetrical dyes of the above Formula I are obtained by reacting a quaternary salt of the general Formula II:

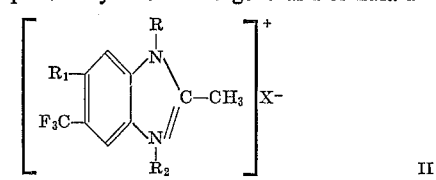

with chloral hydrate in a basic medium, R, $R_1$ and $R_2$ have the meanings assigned above.

According to another feature of the present invention unsymmetrical dyes of the above Formula I are obtained by reacting the above quaternary salt of Formula II in a basic medium with an intermediate of the general Formula III:

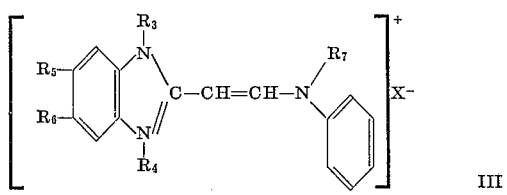

wherein $R_7$ represents the residue of an acid group such as acetyl or p-toluenesulphonyl, or by reacting a quaternary salt of the general Formula IV:

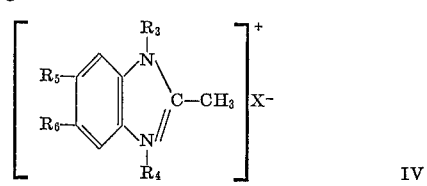

in a basic medium with an intermediate of the general Formula V:

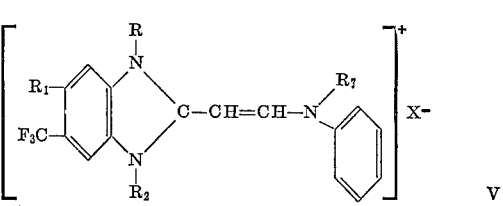

wherein the above Formulae III, IV and V, $R_1$, $R_2$, $R_3$, $R_4$, $R_5$, $R_6$ and $R_7$ have the meanings assigned to them above.

By lower alkyl groups are meant groups containing 1 to 6 carbon atoms. Examples of hydroxyalkyl groups are hydroxymethyl and hydroxyethyl. An example of aralkyl is benzyl. An example of carboxy-substituted aralkyl is carboxybenzyl. An example of carboxy-substituted alkyl is carboxy-methyl. An example of an alkoxycarbonyl group is methoxycarbonyl. An example of an acylsulphonamide alkyl group is γ(acetylsulphonamido) propyl. An example of alkyl sulphonamido alkyl is ethyl sulphonamido butyl. An example of aralkyl sulphonamido alkyl is benzyl sulphonamido ethyl.

A particular use of the cyanine dyes of Formula I above is in a photographic emulsion layer in order to optically sensitize this layer. Therefore, according to a further feature of the present invention there is provided a photographic silver halide emulsion which comprises in sensitizing amount a cyanine dye of the general Formula I.

Another use of the dyes of the present invention is to sensitise zinc oxide when coated in an insulating binder on paper, for use in electrography.

According to yet another feature of the present invention a quaternary salt of the general Formula II where $R_1$ is a halogen atom is prepared by nitrating a 1-alkyl-2-methyl-5-trifluoromethyl benzimidazole to form the 6-nitro derivative, reducing this nitro-derivative to the corresponding amino derivative, diazotising the amino derivative to form the diazonium derivative and replacing the diazonium group by a halogen atom by reaction with cuprous halide or by other known methods and quaternizing the resultant compound with a compound QX wherein X is an anion and Q represents alkyl, hydroxyalkyl, aralkyl, carboxy-substituted aralkyl, carboxy-substituted alkyl, aralkyl, alkyl sulphonamido alkyl, acyl sulphonamido alkyl or a group $HSO_3(CH_2)_n$ where $n$ is 1–6, or by reaction with an alkane sultone

The following preparation will serve to illustrate this latter aspect of the invention:

PREPARATION I.—PREPARATION OF 1-ETHYL-2-METHYL-5-TRIFLUOROMETHYL - 6 - CHLORO-BENZIMIDAZOLE

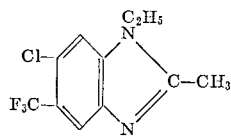

Stage 1.—1-ethyl-2-methyl-5-trifluoromethyl-6-nitro-benzimidazole

Into a nitration mixture consisting of 20.1 cc. nitric acid (d. 1. 41) and 80.5 cc. conc. sulphuric acid were added at 5–10°, in portions, 34.2 g. 1-ethyl-2-methyl-5-trifluoromethyl benzimidazole. After completing the addition the reaction mixture was heated on a boiling water bath for ½ hour, cooled and poured into 400 cc. ice water. The solution was made alkaline with aqueous ammonia and the nitro compound filtered off, washed with cold water and sucked well dry. It was purified by crystallization from 350 cc. aqueous methanol. Yield: 31.6 g. (77% theory); M.P. 169–171°; light yellow crystals.

Stage 2.—1-ethyl-2-methyl-5-trifluoromethyl-6-amino-benzimidazole 24.5 g. 1-ethyl-2-methyl-5-trifluoromethyl-6-nitrobenzimidazole were dissolved in 100 cc. boiling methanol and a solution of 77.5 g. stannous chloride in 70.0 cc. conc. hydrochloric acid added in portions. The mixture was heated on the water bath for 1 hour, then diluted with 1.5 litre water, and the acidity reduced by the addition of 40 cc. of a 40% sodium hydroxide solution. Hydrogen sulphide was passed into the reaction mixture for 2½ hours, then tin sulphide was filtered from the solution and the filtrate made strongly alkaline with a 40% sodium hydroxide solution. The bulk of the amino compound which separated out was filtered off and dissolved in 100 cc. chloroform. The filtrate was also extracted with chloroform, the chloroform solutions were combined and the chloroform distilled off. The residue was crystallized from 50 cc. ethanol. Yield: 19.2 g.=87.5%; light grey crystals; M.P. 204–6°.

Stage 3.—1-ethyl-2-methyl-5-trifluoromethyl-6-chloro-benzimidazole 19.0 g. 1-ethyl-2-methyl-5-trifluoromethyl-6-aminobenzimidazole were dissolved in 9.6 cc. conc. hydrochloric acid diluted with 19.5 cc. water. To the solution obtained was added a further 21.0 cc. conc. hydrochloric acid and the solution was stirred and cooled to 0° C. A solution of 5.39 g. sodium nitrite in 16.5 cc. water was then added at 0–5°. After completion of the diazotisation the solution was filtered from a small amount of insoluble matter and added to a solution of cuprous chloride which had been prepared by the following procedure:

23.1 g. crystalline copper sulphate and 7.7 g. sodium chloride were dissolved in 77.0 cc. water at 60–70° and to the solution was added a solution of 3.85 g. sodium bisulphite in 4.0 cc. water. After allowing to cool to room temperature, the cuprous chloride was filtered off, sucked dry quickly and then dissolved in 38.0 cc. water and 28.8 cc. conc. hydrochloric acid.

The addition of the diazo solution into the cuprous chloride was made in a thin stream at 30° and the mixture was allowed to stand until the main evolution of nitrogen had ceased. Then the mixture was heated on the water bath for ¼ hour. The reaction mixture was then cooled and made strongly alkaline with an excess of aqueous ammonia and the product extracted with ether. The ether was distilled off and the residue crystallized from aqueous methanol. The product was further purified by distillation at 150–2° at 0.2 mm. Yield: 13.6 g. (=67.3% theory) of white crystals; M.P. 119–20°.

Another feature of the present invention is the preparation of a quaternary salt of general Formula II where $R_1$ is alkyl. This preparation is illustrated stage by stage in the following preparation. A para-alkylphenol is treated with carbon tetrahalide and a Friedel-Crafts catalyst and the resultant 4-alkyl-4-trichloromethylcyclohexadienone converted into 3-alkyl-4-trichloromethyl-halobenzene with phosphorus pentahalide, and thence by reaction with antimony trifluoride into 3-alkyl-4-trifluoromethyl halobenzene, followed by nitration to produce 2-halo-4-alkyl-5-trifluoromethyl - 1 - nitro benzene which is heated with an alkylamine to form the 2-alkylamino derivative which is reduced to a 2-alkylamino-4-alkyl-5-trifluoromethyl aniline. This with an acyl chloride forms a 2-methyl-1-alkyl-5-trifluoromethyl-6-alkylbenzimidazole which is quaternized with a reagent QX where X is an anion and Q represents an alkyl, hydroxyalkyl, aralkyl, carboxy-substituted alkyl, carboxy-substituted aralkyl, sulphoalkyl aralkyl or alkyl suphonamidoalkyl or acylsulphonamide alkyl group or with an alkane sultone

where $n$ is 2–6.

PREPARATION II.—PREPARATION OF 1-ETHYL-2,6-DIMETHYL - 5 - TRIFLUOROMETHYL BENZIMIDAZOLE

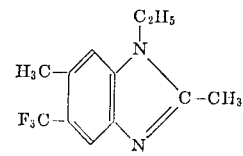

Stage 1.—4-methyl-4-trichloromethyl-2,5-cyclohexadienone

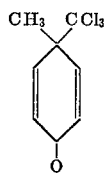

50 g. p-cresol are dissolved in 250 cc. redistilled carbon tetrachloride by heating in a 1 litre 3-necked flask equipped with a condenser on the water bath. Into the boiling solution are added 60 g. of powdered aluminum chloride at a rate allowing the vigorous reaction to subside between each addition. After completion of the addition of the aluminum chloride, the reaction mixture is heated at the refluxing temperature for 2 hours. Excess carbon tetrachloride is then distilled off and the dark brown residue is treated with 300 cc. of 10% hydrochloric acid added dropwise, with a vigorous reaction the residue becomes lighter in colour and melts to a brown oil. The product is isolated by steam distillation and is purified further by crystallization from petroleum ether 65/70°. Yield: 34 g. of white crystals (=33% theory); M.P. 103–4°.

Stage 2.—2-methyl-4-chlorobenzotrichloride

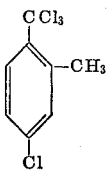

Into a 100 cc. 3-necked flask equipped with a condenser and a calcium chloride tube are placed 28.0 g. phosphorous pentachloride, the flask is placed into an oil bath kept at 60–80°, 8 drops of phosphorus oxychloride, are added, then carefully, in portions, 29.6 g. of 4-methyl-4-trichloromethyl-2,5-cyclohexadienone. After completion of the addition a yellow solution is obtained. The oil bath temperature is then raised slowly to 130–40° so that the reaction mixture boils gently all the time. The oil bath temperature is maintained at this level for 1 hour. During this period hydrochloric acid is evolved. The temperature is then raised to 155–165° and phosphorus oxychloride is removed under water pump vacuum. About 12–13 cc. phosphorus oxychloride are recovered. The product is then distilled from the same flask at 87°/0.1 mm. Yield: 23.0 g.=71% of the colorless oil.

Stage 3.—2-methyl-4-chlorobenzotrifluoride

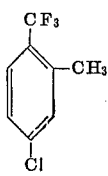

56.56 g. 2-methyl-4-chlorobenzotrichloride and 48.42 g. antimony trifluoride are mixed together and heated in a flask equipped with a condenser on a sand bath with an open flame until the reaction is initiated. The temperature rises from 60° to 120–30°. Heating is discontinued for ½ hour, after which time it is resumed when the internal temperature rises to 165–70°. Heating is continued at this temperature for 1 hour. The apparatus is then adapted for distillation and the crude product is distilled at 160–180° at atmospheric pressure. The crude product containing some antimony chloride is dissolved in 150 cc. ether and the ether solution is washed with 12% hydrochloric acid. The ether solution is dried over calcium chloride, ether is distilled off and the product is distilled twice at 164–6°/760 mm. Yield: 22.0 g. (47.0% theory) of a colorless oil, $n_D^{21}=1.4590$ (sodium light).

Stage 4.—2-methyl-4-chloro-5-nitrobenzotrifluoride

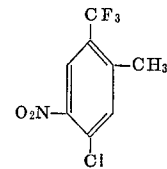

74 g. 2-methyl-4-chlorobenzotrifluoride were added dropwise into a nitrating mixture consisting of 20 cc. nitric acid (d. 1.5), and 30.6 cc. sulphuric acid (d. 1.84) which is stirred at 45–50°. After completion of the addition the reaction mixture is then cooled and poured on to 300 g. crushed ice. The product is then extracted with ether. The ether extracts are washed with water and twice with a 3% sodium carbonate solution and again with water. After drying the ether solution over anhydrous sodium sulphate, ether is distilled off and the residue is distilled at 104–6°/1.5 mm. Yield: 72 g.=81% theory colorless liquid; $n_D^{22}=1.4920$.

Stage 5.—2-methyl-4-ethylamino-5-nitrobenzotrifluoride

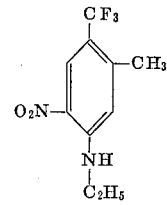

12.7 g. 2-methyl-4-chloro-5-nitrobenzotrifluoride are dissolved in 75 cc. ethanol, and to the solution are added 25 cc. of a 56% aqueous solution of ethyl amine. The mixture is heated at the refluxing temperature for 4 hours, cooled and poured into 75 cc. water. The mixture is made acidic with 35 cc. 5 N hydrochloric acid with external cooling. The product which separates out is filtered off, washed with water, sucked as dry as possible and is crystallized directly from ethanol. Yield 9.7 g. (74.6%) of yellow crystals, M.P. 126–80°.

Stage 6.—2-methyl-4-ethylamino-5-aminobenzotrifluoride

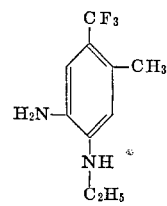

53.0 g. 2-methyl-4-ethylamino-5-nitrobenzotrifluoride in 120 cc. ethyl acetate, in the presence of Raney nickel, are placed into an autoclave and reduced at 80° at 50 atmopheres pressure of hydrogen. The solvent is distilled off after filtration from the catalyst and the residue is crystallized from 100 cc. aqueous ethanol. The yield is 41 g. (88%), of white flakes, M.P. 77–9°.

Stage 7.—1-ethyl-2,6-dimethyl-5-trifluoromethylbenzimidazole 10.9 g. 2-methyl-4-ethylamino-5-aminobenzotrifluoride are dissolved in 36 cc. dry benzene, a solution of 7.2 cc. acetyl chloride in 12 cc. benzene is added dropwise and the mixture is heated at the refluxing temperature for 2 hours. The solvent is distilled off under reduced pressure and the residue is dissolved in 110 cc. 5% hydrochloric acid. The solution is filtered, cooled and made strongly alkaline with aqueous ammonia. The benzimidazole which separates out on cooling is filtered off and washed with cold water. It is dissolved in 150 cc.

ether, the ethereal solution is dried over anhydrous sodium carbonate, ether is distilled off and the residue is distilled at 134–6°/0.1 mm. The yield of light yellow crystals is 9.5 g. (78.5%) M.P. 106–8°.

The following examples will serve to illustrate the preparation of dyes of Formula I from the quaternary salts of Formula II and also illustrate the use of the dyes as sensitizers in silver halide photographic emulsions.

EXAMPLE I (1,3-diethyl-5-trifluoromethyl-6 - chloro - 2-benzimidazole) (1,3-diethyl-5,6-dichloro-2 - benzimidazole) trimethincyanine iodide 1.04 g. 1,3-diethyl-2-methyl-5-trifluoromethyl-6-chlorobenzimidazolium iodide and 1.38 g. of 1,3-diethyl-2 [β(p-sulphonanilide) vinyl]-5,6-dichlorobenzimidazolium chloride in 8.0 cc. nitrobenzene, in the presence of 0.8 cc. triethylamine, were heated at the reflux temperature for ½ hours. The reaction mixture was cooled and the dye was precipitated by dilution with ether, filtered off and washed with ether. The dye was dissolved in 150 cc. methanol, 0.75 g. sodium iodide added and the solution was boiled for 5 minutes, filtered and cooled. The dye was filtered off and recrystallized from 150 cc. methanol. Yield: 0.75 g., red crystals, M.P. 277–9°.

The dye has an absorption maximum at 514 m$\mu$, log $\epsilon$=5.62. When incorporated in a silver iodobromide emulsion, the sensitivity was extended to 590 m$\mu$ with a maximum at 570 m$\mu$.

EXAMPLE II (1-ethyl-3-(p-carboxybenzyl-5-trifluoromethyl - 6 - chloro-2-benzimidazole)-1,3-diethyl-5,6-dichloro - 2 - benzimidazole) trimethincyanine iodide 2.38 g. 1-ethyl-2-methyl-3-p-carboxybenzyl-5-trifluoromethyl-6-chlorobenzimidazolium bromide and 2.75 g. 1,3-diethyl-2[β-(p-sulphonanilido) vinyl]-5,6-dichlorobenzimidazolium chloride in 20 cc. pyridine and 1.5 cc. triethylamine were heated at the reflux temperature for ½ hour. The dye was precipitated by dilution with ether, filtered off and further washed with ether. The dye was dissolved in 200 cc. methanol, to the solution was added 20 cc. of a 25% solution of sodium iodide, the solution was boiled for 5 minutes, filtered and concentrated by distillation to 80 cc., and 10 cc. water were added. The solution was filtered hot and cooled, when the dye crystallized. It was filtered off and crystallized twice from 150 cc. methanol. Yield: 1.0 g., brick red crystals, M.P. 263–4°.

The dye had an absorption maximum in ethanol at 515 m$\mu$, log $\epsilon$=5.28. When incorporated in a silver iodobromide emulsion the dye extended the sensitivity to 590 m$\mu$ with a maximum at 570 m$\mu$.

EXAMPLE III (1 - ethyl - 3 - p - carboxylbenzyl - 5 - trifluoromethyl - 6-chloro-2-benzimidazole) - 1 - ethyl - 3 - methyl - 5 - trifluoromethyl-2-benzimidazole) trimethincyanine iodide 1.17 g. 1-ethyl-2-methyl-3-carboxybenzyl-5-trifluoromethyl-6-chlorobenzimidazolium bromide and 1.33 g. 1-ethyl-3-methyl-2-[β-(p-tolusulphonanilido) vinyl] - 5 - trifluoromethyl benzimidazolium chloride in 10 cc. pyridine and 0.8 cc. triethylamine were heated at the reflux temperature for ½ hour. The reaction mixture was cooled and the dye precipitated by dilution with ether. It was filtered off and washed with ether. The dye was dissolved in 10 cc. methanol and 10 cc. of a 25% solution of sodium iodide were added. The solution was boiled for 5 minutes, then the methanol was distilled off. To the residue was added 30 cc. water, the dyestuff was extracted into chloroform and the chloroform was distilled off. The dye was then crystallized twice from aqueous isopropanol. Yield: 0.3 g., red crystals, M.P. 258–60°.

The dye has an absorption maximum in ethanol at 508 m$\mu$, log $\epsilon$=5.21. When incorporated in a silver iodobromide emulsion the dye extended the sensitivity to 580 m$\mu$ with a maximum at 560 m$\mu$.

EXAMPLE IV

Anhydro-bis-(1-methyl - 3 - sulphobutyl-5-trifluoromethyl-6-chloro-2-benzimidazole) trimethincyanine hydroxide 0.29 g. sodium were dissolved in 35 cc. absolute ethanol and to the stirred solution of the sodium alcoholate were added 1.92 g. 1,2-dimethyl-3-sulphobutyl-5-trifluoromethyl-6-chlorobenzimidazolium betaine, followed by 0.48 g. chloral alcoholate. The mixture was stirred and heated at the reflux temperature for 1 hour. After cooling of the reaction mixture the crude dye was filtered off, dissolved in 40 cc. methanol, the solution filtered and concentrated to 20 cc. and diluted with 20 cc. water. The dye was filtered off. It was dissolved again in 40 cc. methanol, the volume reduced to 20 cc., filtered and cooled, when the dye crystallized. Yield: 0.2 g. of purple red crystals, M.P. 318–20°. The dye has an absorption maximum at 508 m$\mu$, log $\epsilon$=5.19. When incorporated in a silver iodobromide emulsion the dye extended the sensitivity to 585 m$\mu$ with a maximum at 570 m$\mu$.

EXAMPLE V

Anhydro-bis-(1-ethyl-3-sulphobutyl-5-trifluoromethyl-6-chloro-2-benzimidazole)trimethincyanine hydroxide 0.2 g. sodium were dissolved in 30 cc. absolute ethanol, and to the stirred solution of the sodium alcoholate were added 2.49 g. 1-ethyl-2-methyl-3-sulphobutyl-5-trifluoromethyl-6-chlorobenzimidazolium betaine, followed by 0.48 g. of chloral alcoholate. The reaction mixture was stirred and heated at the refluxing temperature for 2 hours, chilled and the crude dye was filtered off. The crude dye was dissolved in 40 cc. boiling methanol, the solution was concentrated by distillation to 20 cc., filtered and cooled, when the dye crystallized. It was recrystallized from 65 cc. of a 1:2 mixture of ethanol and methanol. Yield: 0.2 g. of pink-red crystals, M.P. 328–30°.

The dye has an absorption in ethanol at 514 m$\mu$, log $\epsilon$=5.27. When incorporated in a silver iodobromide emulsion the dye extended the sensitivity to 590 m$\mu$ with a maximum at 570 m$\mu$.

The dye of this example is of particular utility as sensitizer for the green sensitized emulsion layer when a pyrazolone type magenta color former is present in the emulsion layer.

EXAMPLE VI (1-ethyl - 3[γ(acetylsulphonamido)propyl] - 5 - trifluoromethyl - 6 - chloro-2-benzimidazole)-1,3-diethyl-5,6-dichloro-2-benzimidazole)trimethincyanine iodide 1.1 g. 1,3-diethyl-2[β(p-tolusulphoanilido)vinyl]-5,6-dichlorobenzimidazolium chloride and 1.0 g. 1-ethyl-2-methyl - 3 - [γ(acetylsulphonamido)propyl] - 5 - trifluoromethyl-6-chlorobenzimidazolium bromide in 10 cc. pyridine and 0.8 cc. triethylamine were heated at the reflux temperature for ½ hour. The reaction mixture was cooled and the dye was precipitated by dilution with ether. It was filtered off and washed with ether. The crude dye was dissolved in 50 cc. methanol, and 8 cc. of a 25% solution of sodium iodide were added. The solution was boiled for 5 minutes, then the methanol was distilled off. The residue was stirred with 50 cc. cold water, the dye was filtered off and washed with water. It was dissolved in 50 cc. chloroform and chromatographed on neutral alumina, using chloroform as the eluent. Chloroform was distilled off and the dye was crystallized from 30 cc. ethanol. Yield: 0.3 g., pink crystals, M.P. 250–2°.

The dye has an absorption maximum in ethanol at 514 m$\mu$, log $\epsilon$=5.28. When incorporated in a silver iodobromide emulsion the dye extended the sensitivity to 585 m$\mu$ with a maximum at 570 m$\mu$.

EXAMPLE VII (1-methyl - 3 - ethyl - 5 - trifluoromethyl-6-chloro-2-benzimidazole) - 1 - ethyl-3[γ(acetylsulphonamido)propyl]-5,6-dichloro-2-benzimidazole)trimethincyanine iodide 0.94 g. 1-ethyl-2-methyl-3[γ(acetylsulphonamido)propyl]-5,6-dichlorobenzimidazolium bromide and 1.14 g. 1-methyl - 3-ethyl-2-[β(p-tolusulphonanilide)vinyl]-5-trifluoromethyl-6-chlorobenzimidazolium chloride in 10 cc. pyridine and 0.8 cc. triethylamine were heated at the reflux temperature for ½ hour. The reaction mixture was cooled and the dye was precipitated by dilution with ether. The dye was filtered off and washed with ether. The dye was dissolved in 50 cc. methanol and 10 cc. of a 25% solution of sodium iodide were added. The solution was boiled for 5 minutes, then the methanol was distilled off. The residue was stirred in 50 cc. cold water, the dye was filtered off, washed with water and dried. It was crystallized twice from 20 cc. ethanol. Yield: 0.2 g. red crystals, M.P. 240–2°.

The dye has an absorption maximum in ethanol at 513 mμ, log ε=5.25. When incorporated into a silver iodobromide emulsion the dye extends the sensitivity to 590 mμ with a maximum at 575 mμ.

EXAMPLE VIII

Bis-(1,3-diethyl-5-trifluoromethyl-6-methyl-2-benzimidazole)trimethincyanine iodide 2.0 g. 2,6-dimethyl-1,3-diethyl-5-trifluoromethylbenzimidazolium iodide were dissolved in 10 cc. nitrobenzene, to the solution were added 2.0 cc. triethyl-o-formate and the mixture was heated at the reflux temperature for 2 hours. After cooling, the dye was precipitated by dilution with ether. The dye was filtered off and washed with ether. The dye was crystallized twice from methanol. Yield: 0.25 g. of red crystals, M.P. 284–6°.

The dye has an absorption maximum in ethanol at 507 mμ, log ε=5.09. When incorporated into a silver iodobromide emulsion the dye extended the sensitivity to 580 mμ with a maximum at 560 mμ.

EXAMPLE IX (1,3-diethyl-5-trifluoromethyl - 6 - methyl - 2 - benzimidazole)(1,3-diethyl - 5,6 - dichloro - 2 - benzimidazole)trimethincyanine iodide 0.995 g. 2,6 - dimethyl - 1,3 - diethyl-5-trifluoromethylbenzimidazolium iodide and 1.38 g. 1,3-diethyl-2[β(p-tolusulphoanilido)vinyl] - 5,6 - dichlorobenzimidazolium chloride were dissolved in 8 cc. nitrobenzene. To the solution was added 0.8 cc. triethylamine and the mixture was heated at the reflux temperature for ½ hour. The dye was precipitated after cooling the solution by dilution with ether. The dye was filtered off and washed with ether. It was dissolved in 150 cc. methanol, to the solution were added 0.75 g. sodium iodide, the solution was boiled for 5 minutes, filtered and the dye crystallized on cooling. The dye was crystallized a second time from 100 cc. methanol. Yield: 0.75 g., red crystals, M.P. 182–4°.

The dye has an absorption maximum in ethanol at 512 mμ, log ε=5.30. When incorporated into a silver iodobromide emulsion the dye extended the sensitivity to 590 mμ with a maximum at 570 mμ.

EXAMPLE X

Anhydro - bis - (1 - ethyl-3-sulphopropyl-5-trifluoromethyl - 6 - methyl-2-benzimidazole) trimethincyanine hydroxide 0.58 g. sodium were dissolved in 50 cc. absolute ethanol, and to the stirred solution of the sodium alcoholate were added 3.64 g. 1-ethyl-2,6-dimethyl-3(sulphopropyl)-5-trifluoromethyl benzimidazolium betaine. To the solution obtained was added 0.96 g. chloral alcoholate and the mixture was heated at the reflux temperature for 2 hours. The reaction mixture was cooled and the dye was filtered off. The dye was dissolved in 250 cc. methanol, filtered and the solution was concentrated by distillation to 50 cc., filtered and the dye was crystallized. The dye was crystallized a second time from 200 cc. of a mixture of methanol and ethanol (4:1) after distilling off methanol. Yield: 0.73 g., brick-red crystals, M.P. 338–40°. The dye has an absorption maximum in methanol at 508 mμ, log ε=5.26. When incorporated into a silver iodobromide emulsion the dye extended the sensitivity to 580 mμ with a maximum at 560 mμ.

EXAMPLE XI (1,3 - diethyl - 5 - trifluoromethyl - 6 - amino-2-benzimidazole) - (1,3 - diethyl - 5,6 - dichloro-2-benzimidazole) trimethincyanine iodide 1.99 g., 1,3-diethyl-2-methyl-5-trifluoromethyl-6-aminobenzimidazolium iodide and 2.75 g. 1,3-dimethyl-2[β(p-tolusulphoanilido)vinyl] - 5,6 - dichlorobenzimidazolium chloride were dissolved in 20 cc. pyridine.

1.4 cc. triethylamine were added and the mixture was heated at the reflux temperature for 1 hour. The dye was precipitated, after cooling, by dilution with ether, filtered off and washed with ether. The dye was dissolved in 100 cc. methanol, 1.9 g. sodium iodide added, the solution was boiled for 5 minutes, filtered and methanol was distilled off. The dye was dissolved in 50 cc. chloroform and chromatographed on neutral alumina using methanol/chloroform (1:1) as eluent. The solvents were distilled off and the dye was crystallized twice from 40 cc. ethanol. Yield: 0.25 g., brown-red crystals, M.P. 260–2°.

The dye has an absorption maximum in ethanol at 519 mμ, log ε=5.19. When incorporated into a silver iodobromide emulsion the dye extended the sensitivity to 590 mμ with a maximum at 570 mμ.

EXAMPLE XII (1 - ethyl - 3 - methyl-5-trifluoromethyl-6-amino-2-benzimidazole)-(1,3 - diethyl - 5,6 - dichloro - 2-benzimidazole) trimethincyanine iodide 1.92 g. 1-ethyl-2,3-dimethyl-5-trifluoromethyl-6-aminobenzimidazolium iodide and 2.75 g. 1,3-diethyl-2[β(p-sulphoanilido)vinyl] - 5,6-dichlorobenzimidazolium chloride were dissolved in 20 cc. pyridine. To the solution were added 1.5 cc. triethylamine and the mixture was heated at the reflux temperature for 1 hour. The reaction mixture was cooled and the dye was precipitated by dilution with ether. The dye was filtered off and washed with ether. The dye was dissolved in 50 cc. of a mixture of chloroform and methanol (1:1) and chromatographed on neutral alumina using the same mixture of solvents as the eluent. The solvents were distilled off. The dye was dissolved in 100 cc. of methanol and ethanol (1:1), filtered, distilled off 40 cc. methanol, filtered and the dye was crystallized. Yield: 0.94 g., purple-red crystals, M.P. 280–2°.

The dye has an absorption maximum in ethanol at 518 mμ. When incorporated into a silver iodobromide emulsion the dye extends the sensitivity to 595 mμ with a maximum at 575 mμ.

EXAMPLE XIII (1,3 - diethyl - 5 - trifluoromethyl - 6-chloro-2-benzimidazole)-(1,3 - diethyl - 5 - cyano - 2-benzimidazole) trimethincyanine iodide 1.26 g. 1,3-diethyl-2-methyl-5-trifluoromethyl-6-chlorobenzimidazolium iodide and 1.52 g. 1,3-diethyl-2[β-(p-tolusulphoanilido)vinyl] - 5-cyanobenzimidazolium chloride were dissolved in 12 cc. pyridine, 1.0 cc. triethylamine added to the solution and the mixture was heated at the reflux temperature for 1 hour. The solution was cooled and the dye was precipitated by dilution with ether. The dye was filtered off and washed with ether. The dye was dissolved in 150 cc. methanol, 1.2 g. sodium iodide added and the solution boiled for 5 minutes, then the methanol distilled off. The dye was stirred in 50 cc. water, filtered and washed with water. The dye was dissolved in 50 cc. chloroform filtered and the solvent distilled off. It was again dissolved in 50 cc. chloroform and chromatographed on neutral alumina, using chloroform as the eluent. Chloroform was distilled off and the dye was dissolved in 60 cc. of a mixture of methanol and ethanol (1:1), filtered and the dye crystallized by cooling. Yield: 0.6 g., purplered crystals, M.P. 271–3°.

The dye has an absorption maximum in ethanol at 512 m$\mu$, log $\epsilon$=5.26. When incorporated into a silver iodobromide emulsion the dye extended the sensitivity to 595 m$\mu$ with a maximum at 582 m$\mu$.

EXAMPLE XIV (1 - ethyl - 3[$\gamma$(acetylsulphonamido)propyl] - 5 - trifluoromethyl - 6 - chloro - 2 - benzimidazole) - (1,2-diethyl-5-cyano-2-benzimidazole)trimethincyanine iodide 1.0 g. 1-ethyl-2-methyl-3[$\gamma$(acetylsulphonamido) propyl] - 5 - trifluoromethyl - 6 - chlorobenzimidazolium bromide and 1.0 g. 1,3 - diethyl - 2[$\beta$(p-tolusulphoanilido)vinyl]-5-cyanobenzimidazolium chloride were dissolved in 7.0 cc. nitrobenzene, to the solution was added 0.7 cc. triethylamine and the mixture was heated at the reflux temperature for ¼ hour. The mixture was cooled and the dye was precipitated by dilution with ether. The dye was filtered off and washed with ether. It was dissolved in 50 cc. methanol, to the solution were added 8 cc. of a 25% solution of sodium iodide, the solution was boiled for 5 minutes and methanol was distilled off. To the residue were added 30 cc. water and the dye was extracted with chloroform. The chloroform solution was filtered and chloroform was distilled off. The residue was dissolved in a mixture of chloroform and methanol (4:1) and chromatographed twice on neutral alumina using the same mixture of chloroform and methanol as eluent. After removing the solvents by distillation the dye was crystallized from 10 cc. ethanol. Yield: 0.1 g., purple crystals, M.P. 247–9°. The dye has an absorption maximum in ethanol at 517 m$\mu$, log $\epsilon$=5.25. When incorporated into a silver iodobromide emulsion the dye extended the sensitivity to 590 m$\mu$ with a maximum at 575 m$\mu$.

EXAMPLE XV

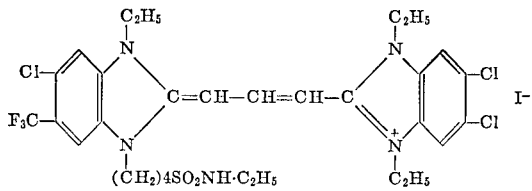

(1-ethyl - 3 - [4-(ethylsulphonamido)butyl] - 5 - trifluoromethyl - 6 - chloro - 2 - benzimidazole) - (1,3-diethyl-5,6-dichloro-2-benzimidazole) trimethin cyanine iodide 2.02 g. 1-ethyl - 2 - methyl - 3[4-(ethylsulphonamido) butyl]-5-trifluoromethyl - 6 - chlorobenzimidazolium bromide and 2.2 g. 1,3-diethyl-2[2-(p-tolusulphoanilido)vinyl]-5,6-dichlorobenzimidazolium bromide in 20 cc. pyridine and 1.6 cc. triethylamine were heated at the reflux temperature for ½ hour. The dye was precipitated after cooling by dilution with ether. The dye was filtered off and washed with ether. The dye was dissolved in 120 cc. methanol and 16 cc. of a 25% solution of sodium iodide were added. The solution was boiled for 5 minutes, then the methanol was distilled off. To the aqueous residue were added 50 cc. water and the dye was extracted with chloroform. The chloroform solution was filtered and the chloroform distilled off. The dye was again dissolved in 50 cc. chloroform, the solution filtered from a small amount of impurity and chloroform was distilled off. The dye was dissolved in 60 cc. ethanol/methanol (1:1), most of the methanol distilled off, and the solution was filtered and cooled, whereby the dye crystallized. The dye was recrystallized in the same way. Yield: 0.86 g., purple crystals, M.P. 230–2°.

The dye has an absorption maximum in ethanol at 514 m$\mu$, log $\epsilon$=5.27. When incorporated in a silver iodobromide emulsion the dye extended the sensitivity to 590 m$\mu$ with a maximum at 575 m$\mu$.

EXAMPLE XVI

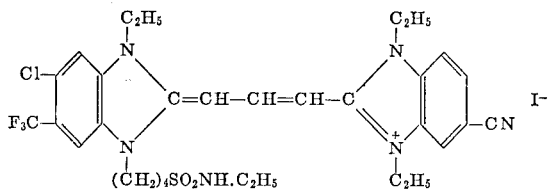

(1-ethyl - 3 - [4-(ethylsulphonamido)butyl] - 5 - trifluoromethyl - 6 - chloro - 2 - benzimidazole) - (1,3-diethyl-5-cyano-2-benzimidazole)trimethin cyanine iodide 2.02 g. 1-ethyl - 2 - methyl - 3 -[4-(ethylsulphonamido) butyl]-5-trifluoromethyl - 6 - chlorobenzimidazolium bromide and 2.02 g. 1.3-diethyl-2[2-(p-tolusulphoanilido)vinyl]-5-cyanobenzimidazolium chloride in 20 cc. pyridine and 1.6 cc. triethylamine were heated at the reflux temperature for ½ hour. The dye was precipitated after cooling by dilution with ether. The dye was filtered off and washed with ether. The dye was dissolved in 100 cc. methanol and 16 cc. of a 25% solution of sodium iodide were added. The solution was boiled for 5 minutes, then the methanol was distilled off. To the aqueous residue were added 60 cc. water and the dye was extracted with chloroform. The chloroform was distilled off and the dye was dissolved in 50 cc. hot chloroform, the solution was filtered and the chloroform was distilled off. The residual dye was crystallized twice from 70 cc. ethanol. Yield: 0.52 g., maroon crystals, M.P. 238–40°.

The dye has an absorption maximum in ethanol at 514 m$\mu$, log $\epsilon$=5.24. When incorporated in a silver iodobromide emulsion the dye extended the sensitivity to 585 m$\mu$ with a maximum at 570 m$\mu$.

EXAMPLE XVII

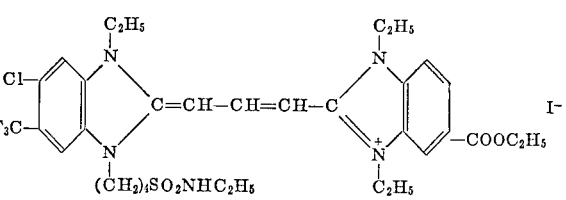

(1-ethyl - 3[4 - (ethylsulphonamido)butyl]-5-trifluoromethyl-6-chloro - 2 - benzimidazole(1,3-diethyl-5-ethoxycarbonyl-2-benzimidazole) trimethin cyanine iodide 2.02 g. 1 - ethyl-2-methyl-3[4(ethylsulphonamido)butyl]-5-trifluoromethyl-6 - chlorobenzimidazolium bromide and 2.20 g. 1,3-diethyl-2-[(p-tolusulphoanilido)vinyl]-5-ethoxycarbonyl benzimidazolium chloride in 20 cc. pyridine and 1.6 cc. triethylamine were heated at the reflux temperature for ½ hour. The dye was precipitated after cooling by dilution with ether. The dye was filtered off and washed with ether. It was dissolved in 100 cc. methanol, and 16 cc. of a 25% solution of sodium iodide were added. The solution was boiled for 5 minutes, then the methanol was distilled off. To the aqueous residue were added 60 cc. water and the dye was extracted with chloroform. The chloroform was distilled off and the dye was again dissolved in 50 cc. chloroform, filtered and the chloroform was distilled off. The dye was chromatographed twice on neutral alumina using chloroform as the eluent. Chloroform was distilled off and the dye was crystallized twice from a mixture of ethanol and methanol. Yield: 0.35 g., red crystals, M.P. 264–6°.

The dye has an absorption maximum in ethanol at 514 m$\mu$, log $\epsilon$=5.23. When incorporated in a silver iodobromide emulsion the dye extended the sensitivity to 575 m$\mu$, with a maximum at 565 m$\mu$.

EXAMPLE XVIII

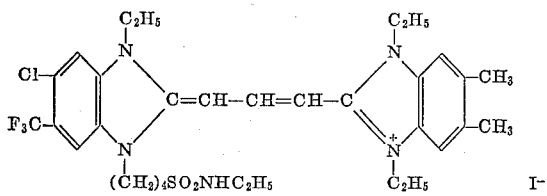

(1 - ethyl - 3[4 - (ethylsulphonamido)butyl]-5-trifluoromethyl-6-chloro - 2 - benzimidazole) - (1,3-diethyl-5-trifluoromethyl-6-methyl - 2 - benzimidazole) trimethin cyanine iodine 1.52 g. 1 - ethyl-2-methyl - 3[4 - (ethylsulphonamido) butyl]-5-trifluoromethyl - 6 - chlorobenzimidazolium bromide and 1.69 g. 1,3-diethyl-2[2-((p-tolusulphoanilido) vinyl]-5- trifluoromethyl-6-methyl benzimidazolium chloride in 15 cc. pyridine and 1.2 cc. triethylamine were heated at the reflux temperature for ½ hour. The dye was precipitated by dilution with ether, filtered off and washed with ether. The dye was dissolved in 75 cc. methanol and 12 cc. of a 25% solution of sodium iodide were added. The solution was boiled for 5 minutes, then the methanol was distilled off. To the aqueous residue 30 cc. water were added and the dye was extracted with chloroform. The chloroform solution was filtered and the chloroform was distilled off. The dye was again dissolved in 50 cc. chloroform, filtered and the chloroform was distilled off. The dye was chromatographed on neutral alumina using chloroform/methanol (1:11) as the eluent. The solvents were distilled off. The dye was then crystallized twice from a mixture of ethanol/methanol (1:1). Yield: 0.64 g., red crystals, M.P. 258–60°.

The dye has an absorption maximum in ethanol at 508 m$\mu$ log $\epsilon$=5.30. When incorporated in a silver iodobromide emulsion the dye extended the sensitivity to 575 m$\mu$ with a maximum at 565 m$\mu$.

EXAMPLE XIX (1,3-diethyl - 5 - trifluoromethyl - 6 - methyl-2-benzimidazole)-(1,3 - diethyl - 5 - cyano - 2 - benzimidazole)trimethincyanine iodide 1.19 g. 1,3-diethyl-2,6-dimethyl-5-trifluoromethyl benzimidazolium iodide and 1.52 g. 1,3-diethyl-2[$\beta$-(p-tolusulphoanilido)vinyl]-5-cyano-benzimidazolium chloride in 12 cc. pyridine and 1 cc. triethylamine were heated at the reflux temperature for ½ hour. The dye was precipitated after cooling by dilution with ether. The dye was filtered off and washed with ether. The dye was dissolved in 120 cc. methanol and 1.2 g. sodium iodide were added. The solution was boiled for 5 minutes, then the methanol was distilled off. The dye was slurried with 60 cc. water, filtered off and washed with water. The dye was dissolved in 60 cc. chloroform, the solution filtered and the chloroform was distilled off. The dye was dissolved in 50 cc. chloroform and chromatographed on neutral alumina using chloroform/methanol (1:1) as the eluent. The solvents were distilled off and the dye was dissolved in 60 cc. ethanol/methanol (1:1), filtered and cooled, whereupon the dye crystallized. Yield: 0.57 g., red crystals, M.P. 278–80°. The dye has an absorption maximum in ethanol at 511 m$\mu$, log $\epsilon$=5.29. When incorporated in a silver iodobromide emulsion the dye extended the sensitivity to 585 m$\mu$ with a maximum at 570 m$\mu$.

EXAMPLE XX (1,3-diethyl - 5 - trifluoromethyl - 6 - amino-2-benzimidazole)-(1,3-diethyl - 5 - cyano - 2 - benzimidazole)trimethincyanine iodide 1.20 g. 1,3-diethyl-2-methyl-5-trifluoromethyl-6-amino benzimidazolium iodide and 1.52 g. 1,3-diethyl-2[$\beta$-(p-tolusulphoanilido)vinyl] - 5-cyanobenzimidazolium chloride in 12 cc. pyridine and 1.0 cc. triethylamine were heated at the reflux temperature for 1 hour. The dye was precipitated after cooling by dilution with ether. The dye was filtered off and washed with ether. The dye was dissolved in 130 cc. methanol and 1.2 g. sodium iodide were added. The solution was boiled for 5 minutes, then the methanol was distilled off. The dye was slurried with 60 cc. water, filtered off and washed with water. The dye was dissolved in 60 cc. chloroform, filtered and chloroform was distilled off. The dye was dissolved in 50 cc. chloroform/methanol (4:1) and chromatographed on neutral alumina, using the same mixtures of solvents as the eluent. The solvents were distilled off and the dye was dissolved in 60 cc. ethanol/methanol (1:1), the methanol was distilled off and the solution was filtered and cooled, whereupon the dye crystallized. Yield: 0.46 g., maroon-red crystals, M.P. 246–8°. The dye has an absorption maximum in ethanol at 518 m$\mu$ log $\epsilon$=5.03. When incorporated in a silver iodobromide emulsion the dye extended the sensitivity to 585 m$\mu$ with a maximum at 570 m$\mu$.

EXAMPLE XXI (1 - ethyl - 3[3 - acetylsulphonamido)propyl]-5-trifluoromethyl-6-chloro - 2 - benzimidazole) - (1,3-diethyl-5-ethoxycarbonyl - 2 - benzimidazole) trimethincyanine iodide 1.50 g. 1-ethyl-2-methyl-3[$\gamma$(acetylsulphonamido)propyl]-5-trifluoromethyl-6-chloro benzimidazolium bromide and 1.66 g. 1,3-diethyl-2[$\beta$(p-tolusulphonanilido)vinyl]-5-ethoxycarbonyl benzimidazolium chloride in 15 cc. pyridine and 1.5 cc. triethylamine were heated at the reflux temperature for 1 hour. The dye was precipitated after cooling by dilution with ether. The dye was ground with ether, filtered off and washed with ether. The dye was dissolved in 80 cc. methanol and 12 cc. of a 25% solution of sodium iodide were added. The solution was boiled for 5 minutes then the methanol was distilled off. To the aqueous residue were added 60 cc. water. The dye was slurried with the water, filtered off and washed with water and dried. The dye was dissolved in 50 cc. chloroform and chromatographed on neutral alumina, using chloroform/methanol (4:1) as the eluent. The solvents were distilled off. The dye was dissolved in 60 cc. ethanol/methanol, the solution was concentrated by distillation to 25 cc., filtered and the dye crystallized by cooling. The dye was recrystallized in the same way. Yield: 0.50 g., red crystals, M.P. 248–50°. The dye has an absorption maximum in ethanol at 514 m$\mu$, log $\epsilon$=5.24. When incorporated in a silver iodobromide emulsion the dye extended the sensitivity to 580 m$\mu$ with a maximum at 565 m$\mu$.

EXAMPLE XXII (1-ethyl - 3 - [$\beta$-(hydroxyethyl)-5-trifluoromethyl-6-chloro-2-benzimidazole) - (1,3 - diethyl-5,6-dichloro-2-benzimidazole)trimethincyanine iodide 1.94 g. 1-ethyl-2-methyl-3($\beta$-hydroxyethyl)-5-trifluoromethyl-6-chlorobenzimidazolium bromide and 2.75 g. 1,3-diethyl-2[$\beta$(p - tolusulphoanidido)vinyl]5,6 - dichlorobenzimidazolium chloride in 20 cc. pyridine and 1.6 cc. triethylamine were heated at the reflux temperature for 1 hour. The dye was precipitated after cooling by dilution with ether. The dye was filtered off and washed with ether. The dye was dissolved in 100 cc. methanol and 20 cc. of a 25% solution of sodium iodide were added. The solution was boiled for 5 minutes, then the methanol was distilled off, filtering off at intervals the dye which separated out on concentration of the solution. The dye which had been filtered off was added to the aqueous residue and slurried with 80 cc. water. The dye was filtered off, washed with water and dried. The dye was dissolved in 60 cc. chloroform/methanol (1:1) and chromatographed on neutral alumina, using the same mixture of solvents as the eluent. The solvents were distilled off. The dye was dissolved in 200 cc. ethanol/methanol (1:1), most of the methanol was distilled off and the solution was filtered and cooled, whereupon the dye crystallized. The dye was recrystallized in the same way. Yield: 0.85 g., red crystals, M.P. 280–2°. The dye has an absorption maximum in ethanol at 513 mμ, log ε=5.90. When incorporated in a silver iodobromide emulsion the dye extended the sensitivity to 590 mμ with a maximum at 575 mμ.

EXAMPLE XXIII (1 - ethyl - 3 - [β(hydroxyethyl)] - 5 - trifluoromethyl-6 - methyl - 2 - benzimidazole) - (1,3 - diethyl - 5,6-dichloro - 2 - benzimidazole)trimethincyanine iodide 1.83 g. 1 - ethyl - 2,6 - dimethyl - 3(β-hydroxyethyl)-5-trifluoromethyl benzimidazolium bromide and 2.75 g. 1,3 - diethyl - 2[β(p-tolusulphoanilido)vinyl] - 5,6 - dichloro benzimidazolium chloride in 20 cc. pyridine and 1.6 cc. triethylamine were heated at the reflux temperature for 1 hour. The dye was precipitated after cooling by dilution with ether. The dye was filtered off and washed with ether. The dye was dissolved in 150 cc. methanol and 20 cc. of a 25% solution of sodium iodide were added. The solution was boiled for 5 minutes then the methanol was distilled, filtering off at intervals the dye which separated out during the concentration of the solution. The dye which was filtered off was combined with the aqueous residue, 100 cc. water were added, the dye was slurried, filtered off, washed with water and dried. The dye was dissolved in 50 cc. chloroform/methanol (1:1) and chromatographed on neutral alumina, using the same mixture of solvents as the eluent. The solvents were distilled off. The dye was dissolved in 150 cc. ethanol/methanol (1:2), most of the methanol distilled off and the solution cooled, whereupon the dye crystallized. The dye was recrystallized in the same way. Yield: 1.1 g., red crystals, M.P. 276–8°. The dye has an absorption maximum in ethanol at 512 mμ, log ε=5.89. When incorporated in a silver iodobromide emulsion the dye extended the sensitivity to 585 mμ with a maximum at 570 mμ.

EXAMPLE XXIV

1(ethyl - 3[4 - (acetylsulphonamido)butyl] - 5 - trifluoromethyl - 6 - chloro - 2 - benzimidazole)-(1,3-diethyl-5,6-dichloro-2-benzimidazole) trimethincyanine iodide 2.08 g. 1 - ethyl - 2 - methyl-3[4-(acetylsulphonamido)butyl] - 5 - trifluoromethyl - 6 - chlorobenzimidazolium bromide and 2.2 g. 1,3-diethyl-2-[β(p-tolusulphoanilido)vinyl] - 5,6 - dichlorobenzimidazolium chloride in 20 cc. pyridine and 1.6 cc. triethylamine were heated at the reflux temperature for ½ hour. The dye was precipitated after cooling by dilution with ether. The dye was filtered off and washed with ether. The dye was dissolved in 100 cc. methanol and 16 cc. of a 25% solution of sodium iodide were added. The solution was boiled for 5 minutes, then the methanol was distilled off. To the aqueous residue were added 60 cc. of water, slurried and the dye was filtered off, washed with water and dried. The dye was dissolved in 60 cc. ethanol/methanol (1:1) and methanol was distilled off, the solution was filtered and cooled, whereupon the dye crystallized. The dye was recrystallized in the same way. Yield: 0.93 g., red-brown crystals, M.P. 252–4°. The dye has an absorption maximum in ethanol at 514 mμ, log ε=5.23. When incorporation in a silver iodobromide emulsion the dye extended the sensitivity to 585 mμ with a maximum at 570 mu.

EXAMPLE XXV (1 - ethyl - 3[4 - (ethylsulphonamido)butyl] - 5 - trifluoromethyl - 6 - chloro - 2 - benzimidazole)-(1,3-diethyl - 5,6 - dichloro - 2 - benzimidazole) trimethincyanine iodide 2.02 g. 1 - ethyl - 2 - methyl - 3[4(ethylsulphonamido)butyl] - 5 - trifluoromethyl - 6 - chloro benzimidazolium bromide and 2.2 g. 1,3 - diethyl-2[β(p-tolusulphoanilido)vinyl] - 5,6 - dichlorobenzimidazolium chloride in 20 cc. pyridine and 1.6 cc. triethylamine were heated at the reflux temperature for ½ hour. The dye was precipitated after cooling by dilution with ether. The dye was filtered off and washed with ether. The dye was dissolved in 120 cc. methanol and 16 cc. of a 25% solution of sodium iodide were added. The solution was boiled for 5 minutes, then the methanol was distilled off, filtering off at intervals the dye which separated out on concentration of the solution. The dye which was filtered off was added to the aqueous residue, followed by 80 cc. water. The dye was slurried with the water and extracted with chloroform. Chloroform was distilled off. The dye was extracted with hot chloroform and the solution was filtered from a small amount of impurity. Chloroform was distilled off and the dye was again extracted with hot chloroform, filtered and chloroform distilled off. The dye was dissolved in 60 cc. ethanol/methanol (1:1), ethanol was distilled off, the solution was filtered and cooled, whereupon the dye crystallized. The dye was recrystallized in the same way. Yield: 0.86 g., pink crystals, M.P. 230–2°. The dye has an absorption maximum in ethanol at 514 mμ, log ε=5.27. When incorporated in a silver iodobromide emulsion the dye extended the sensitivity to 590 mμ with a maximum at 575 mμ.

The dyes of this invention show high relative log speed, and little desorption from silver halide grains. These properties which make the present products especially useful as optical sensitizing agents are unexpected as evidenced by the following comparative data using representative products of U.S. Pat. 3,348,949 for comparison purposes:

The sensitizing dye under test, dissolved in 2-methoxy ethanol, was added to a melted gelatino silver iodobromide emulsion in a proportion of 2.20 g. per gram mole of silver halide present.

Sensitizing dyes used

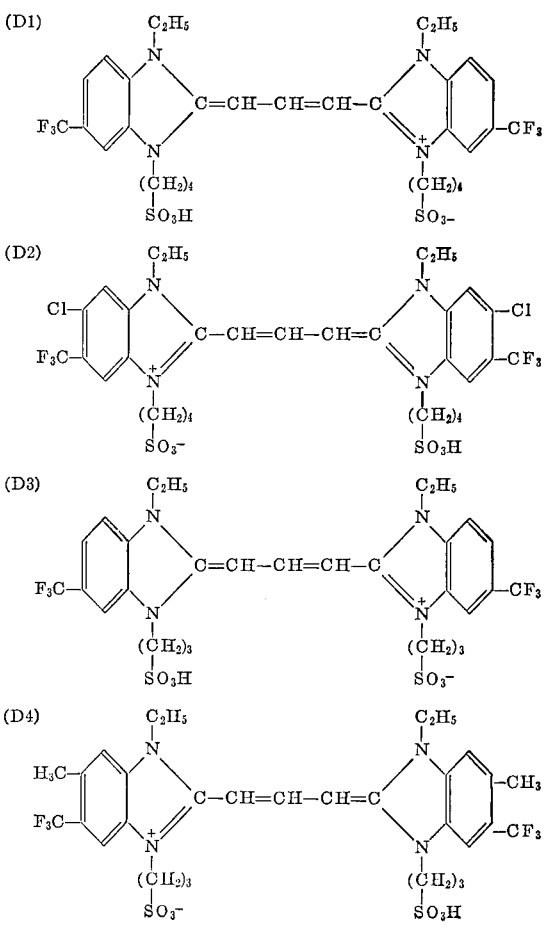

(D5) 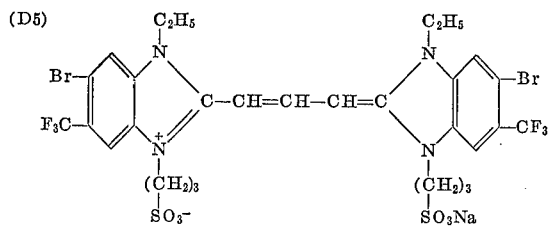

A mixture (3:1 molecule ratio) of color couplers of the structures A and B set out below was wetted with methanol and dissolved in normal potassium hydroxide solution and added to the dyed emulsion.

(A.) (B.) 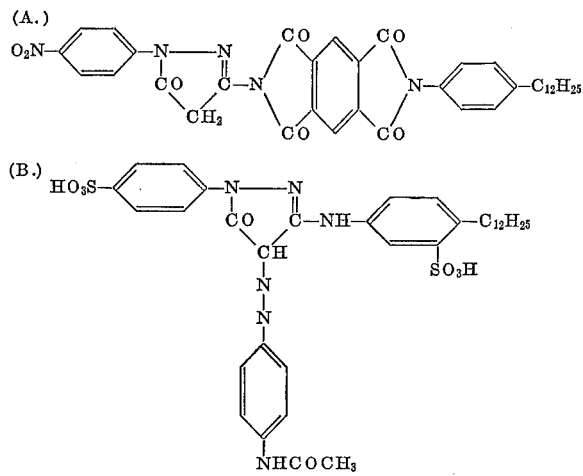

The resulting emulsion was immediately divided into two parts; one part was coated immediately on conventional film base and the other was kept for 3 hours at 37° C. and then coated using the same type of film base.

The coated films were exposed through a yellow filter, transmitting substantially no light of wavelengths shorter than 510 mm. and the films were then processed through a conventional color negative processing sequence.

The following relative log speed values were obtained:

DYES

|  | D1 | D2 | D3 | D4 | D5 |
|---|---|---|---|---|---|
| Relative log speed of emulsion coated as soon as possible after addition of the dye | 2.16 | 3.34 | 2.54 | 3.00 | 3.23 |
| Relative log speed of the emulsion coated after standing for 3 hours at 37° C | >1.00 | 3.18 | >1.00 | 2.96 | 3.16 |

It will be noted that the "initial" speeds of dyes D1 and D3 are much lower than those of dyes D2, D4 and D5. This is due to the unavoidable lapse of time between dye addition and the coating operation, even though it is done as quickly as laboratory conditions allow. In other words, there is already a considerable desorption of dye during that short period. The very low speed figures for dyes D1 and D3 where the emulsion was allowed to stand for 3 hours before coating show that during that period the dye had been completely desorbed from the silver halide grains. On the contrary, the dyes D2, D4 and D5 of the present invention show a high relative log speed on immediate coating of the emulsions and this is very little reduced even when the emulsion is kept for 3 hours before coating.

The technical importance of the advantages obtained by the present dyes, as shown above, is readily apparent since in commercial practice photographic emulsions are invariably made at a site separate from the actual coating rooms and it is inevitable that there must be a substantial lapse of time between emulsion making and coating. To some extent the difficulty can be overcome by adding the dye to the emulsion at a final stage immediately before coating but it will be realized that this introduces practical difficulties since the dye has to be homogeneously mixed in the emulsion which involves bringing the mixing plant into the vicinity of the coating heads of the coating machines.

What is claimed is:

1. A photographic gelatino silver halide emulsion containing at least one cyanine dye of the following formula:

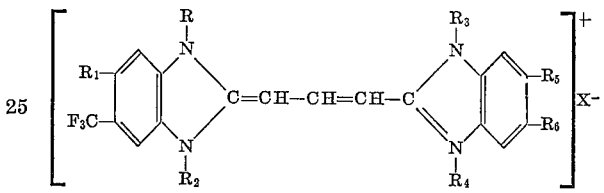

wherein $R_1$ represents a halogen atom or a lower alkyl or amine group, $R$ and $R_3$ are the same or different and represent lower alkyl groups, $R_2$ and $R_4$ are the same or different and represent alkyl, hydroxyalkyl, aralkyl, carboxy-substituted aralkyl, carboxy-substituted alkyl, a group —$(CH_2)_nSO_3H$ where $n$ is an integer from 1 to 6, an acylsulphonamido alkyl group of the formula —$(CH_2)_nSO_2NHCOR_8$ where $n$ is an integer from 1 to 6 and $R_8$ is an alkyl group, or an alkyl or aralkyl sulphonamido alkyl group of the formula

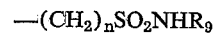

where $n$ is an integer from 1 to 6 and $R_9$ is an alkyl or aralkyl group, $R_5$ represents a hydrogen or a halogen atom or an alkyl or amino group, $R_6$ represents a hydrogen or halogen atom or a trifluoromethyl, cyano or alkoxycarbonyl group, except that when $R_1$ and $R_5$ each represent a chlorine atom and $R_6$ represents a trifluoromethyl group $R_2$ and $R_4$ do not represent the same alkyl groups and X is an anion.

References Cited

UNITED STATES PATENTS

| 2,289,300 | 7/1942 | Wilmanns et al. | 96—137 |
| 3,348,949 | 10/1967 | Bannert et al. | 96—124 |

FOREIGN PATENTS

| 505,979 | 5/1939 | Great Britain | 96—137 |

J. TRAVIS BROWN, Primary Examiner

U.S. Cl. X.R.

96—1.7; 260—240.6